United States Patent
Zhang et al.

(10) Patent No.: US 11,734,353 B2
(45) Date of Patent: Aug. 22, 2023

(54) MULTI-SAMPLING MODEL TRAINING METHOD AND DEVICE

(71) Applicant: ALIBABA GROUP HOLDING LIMITED, George Town (KY)

(72) Inventors: Ke Zhang, Hangzhou (CN); Wei Chu, Hangzhou (CN); Xing Shi, Hangzhou (CN); Shukun Xie, Hangzhou (CN); Feng Xie, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 1134 days.

(21) Appl. No.: 16/112,607

(22) Filed: Aug. 24, 2018

(65) Prior Publication Data
US 2018/0365525 A1    Dec. 20, 2018

Related U.S. Application Data

(63) Continuation of application No. PCT/CN2017/073446, filed on Feb. 14, 2017.

(30) Foreign Application Priority Data

Feb. 26, 2016 (CN) .......................... 201610110893.4

(51) Int. Cl.
*G06F 18/21* (2023.01)
*G06F 18/2115* (2023.01)
(Continued)

(52) U.S. Cl.
CPC ........ *G06F 16/90335* (2019.01); *G06F 16/00* (2019.01); *G06F 18/217* (2023.01);
(Continued)

(58) Field of Classification Search
CPC .. G06K 9/6262; G06K 9/6231; G06K 9/6257; G06N 20/20; G06N 20/00; G06F 16/90335; G06F 16/00
See application file for complete search history.

(56) References Cited

U.S. PATENT DOCUMENTS 9,501,749 B1 * 11/2016 Narsky .................. G06N 7/023
2004/0015464 A1    1/2004 Li et al.
(Continued)

FOREIGN PATENT DOCUMENTS

CN        103744978 A       4/2014
CN        104915518 A       9/2015
(Continued)

OTHER PUBLICATIONS

D. K. Barrow and S. F. Crone, "Crogging (cross-validation aggregation) for forecasting—A novel algorithm of neural network ensembles on time series subsamples," The 2013 International Joint Conference on Neural Networks (IJCNN), 2013, pp. 1-8, doi: 10.1109/IJCNN.2013.6706740. (Year: 2013).*
(Continued)

*Primary Examiner* — Markus A. Vasquez
(74) *Attorney, Agent, or Firm* — Finnegan, Henderson, Farabow, Garrett & Dunner, LLP

(57) ABSTRACT

The present disclosure provides multi-sampling model training methods and devices. One exemplary training method includes: performing multi-sampling on samples to obtain a training set and a validation set in each sampling; using the training set and the validation set obtained in each sampling as a group, and performing model training and obtaining a trained model using the training set in each group; evaluating the trained model using the training set and the validation set in each group separately; eliminating or retaining the trained model based on the evaluation results and a predetermined elimination criterion; obtaining prediction results
(Continued)

of the samples using retained models; and obtaining a final model by performing combined model training on the retained models using the prediction results. The final model obtained using embodiments of the present disclosure can be more robust and stable, and can provide more accurate prediction results, thus greatly improving efficiency of modeling.

12 Claims, 2 Drawing Sheets

(51) Int. Cl.
    *G06F 18/214*     (2023.01)
    *G06F 16/903*     (2019.01)
    *G06N 20/00*     (2019.01)
    *G06F 16/00*     (2019.01)
    *G06N 20/20*     (2019.01)

(52) U.S. Cl.
    CPC ...... *G06F 18/2115* (2023.01); *G06F 18/2148* (2023.01); *G06N 20/00* (2019.01); *G06N 20/20* (2019.01)

(56) References Cited

U.S. PATENT DOCUMENTS

| | | | | |
|---|---|---|---|---|
| 2011/0173116 A1* | 7/2011 | Yan | ........................ | G06Q 40/02 705/38 |
| 2014/0337269 A1* | 11/2014 | Eads | ........................ | G06N 5/02 706/46 |
| 2015/0032674 A1* | 1/2015 | Cichosz | .................. | G06N 5/003 706/12 |
| 2015/0102216 A1* | 4/2015 | Roder | .................... | G16B 40/20 250/281 |
| 2016/0012317 A1* | 1/2016 | Mayle | .................. | G06K 9/6211 382/159 |
| 2016/0063396 A1* | 3/2016 | Cheng | .................... | G06N 20/20 706/12 |

FOREIGN PATENT DOCUMENTS

| | | |
|---|---|---|
| CN | 105023022 A | 11/2015 |
| WO | WO 2017/43921 A1 | 8/2017 |

OTHER PUBLICATIONS

First Search Report issued by The State Intellectual Property Office of the People's Republic of China in related Chinese Application No. 2016101108934; dated Sep. 26, 2019 (1 pg.).

Fu, Hua et al.; "Prediction of Coal and Gas Outburst Intensity Based on Variable Weight RBF Combination Model"; China Safety Science Journal; vol. 23, No. 8, 31, p. 67, Aug. 2013 (abstract—1 pg.).

Written Opinion and International Search Report of the International Searching Authority issued in related International Application No. PCT/CN2017/073446; dated May 16, 2017 (10 pgs.).

* cited by examiner

MULTI-SAMPLING MODEL TRAINING METHOD AND DEVICE

CROSS-REFERENCE TO RELATED APPLICATIONS

The present application claims priority to International Application No. PCT/CN2017/073446, filed on Feb. 14, 2017, which claims priority to and the benefits of Chinese Patent Application No. 201610110893.4, filed on Feb. 26, 2016 and entitled "MULTI-SAMPLING MODEL TRAINING METHOD AND DEVICE," both of which are incorporated herein by reference in their entireties.

TECHNICAL FIELD

The present disclosure relates to the technical field of machine learning, and in particular, to methods and devices for multi-sampling model training.

BACKGROUND

"Ant Check Later" is a "buy-this-month and pay-next-month" online shopping service provided by Ant Small Loan of Ant Financial Services Group for consumers on Taobao™ and Tmall™. Ant Check Later is, based on the status of the current users, essentially a petty consumer loan with a minimum loan limit of 1000 Yuan and a maximum loan limit of 50000 Yuan. "Ant Check Later" has the same function as a credit card, that is, the function of spending first and payment later, which creates opportunities for cashing out.

A service scenario of an "Ant Check Later" anti-cash out model uses a machine learning algorithm to perform classification or regression analysis on data samples, wherein. The quality and quantity of training samples for training the machine learning algorithm will directly affect prediction performance of the model. On the other hand, the anti-cash out model is a model made for "Ant Check Later" sellers. That is to say a seller corresponds to a sample. Because the number of sellers is limited, the total quantity of data samples is not large, and is far less than the standard amount of "big data." Moreover, information of some sellers is not available due to various reasons. Thus, if the anti-cash out model is built only using the available data samples, the effectiveness of the model would be greatly reduced.

Current techniques build models based on a small sample data set, including an "Ant Check Later" anti-cash out model, and mainly divides a sample data set into a training set and a validation set. Data in the training set will be used for training a machine learning model, and the effectiveness of the model will be validated using the validation set. The drawback of such current techniques is that if the proportion of the training set in the sample data set is too large, the size of the validation set will be reduced correspondingly, and therefore, the effectiveness of the model effect will not be sufficiently validated However, if the proportion of the training set in the sample data set is too small, the model will not be sufficiently trained, resulting in reduced prediction accuracy of the trained model. Therefore, the problem of ineffective model training due to the limited quantity of data samples needs to be solved in building an anti-cash out model.

SUMMARY

Embodiments of the present disclosure provide multi-sampling model training methods and devices to solve the problem of poor model training caused by the limited quantity of data samples.

According to some embodiments of the present disclosure, multi-sampling model training methods are provided. One exemplary multi-sampling model training method includes: performing multi-sampling on samples to obtain a training set and a validation set in each sampling; using the training set and the validation set obtained in each sampling as a group, and performing model training and obtaining a trained model using the training set in each group; evaluating the trained model using the training set and the validation set in each group separately; eliminating or retaining the trained model based on the evaluation results and a predetermined elimination criterion; obtaining prediction results of the samples using retained models; and obtaining an output model by performing combined model training on the retained models using the prediction results.

According to some embodiments of the present disclosure, multi-sampling model training devices are provided. One exemplary multi-sampling model training device includes: a sampling module configured to perform multi-sampling on samples to obtain a training set and a validation set in each sampling; a first training module configured to use the training set and the validation set obtained in each sampling as a group, and to perform model training and obtain a trained model using the training set in each group; an evaluation module configured to evaluate the trained model using the training set and the validation set in each group separately, and to eliminate or retain the trained model based on the evaluation results and a predetermined elimination criterion; and a second training module configured to obtain prediction results of the samples using trained models retained by the evaluation module, and to obtain an output model by performing combined model training on the retained models.

According to some embodiments of the present disclosure, a non-transitory computer readable medium that stores a set of instructions that is executable by at least one processor of a computer to cause the computer to perform multi-sampling model training methods is provided. One exemplary multi-sampling model training method includes: performing multi-sampling on samples to obtain a training set and a validation set in each sampling; using the training set and the validation set obtained in each sampling as a group, and performing model training and obtaining a trained model using the training set in each group; evaluating the trained model using the training set and the validation set in each group separately; eliminating or retaining the trained model based on the evaluation results and a predetermined elimination criterion; obtaining prediction results of the samples using retained models; and obtaining an output model by preforming combined model training on the retained models using the prediction results.

The present disclosure provides model training methods and devices that perform combined model training through multi-sampling, multi-validation, and multi-training using a small sample data set and machine learning algorithms to obtain an output trained model with more robustness and stability. Embodiments of the present disclosure allow for sufficient and repeated mining of user behaviors of the user samples, thereby achieving optimal model fitting and improving the prediction precision.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

BRIEF DESCRIPTION OF THE DRAWINGS

The accompanying drawings constitute a part of this specification. The drawings illustrate several embodiments of the present disclosure and, together with the description, serve to explain the principles of the disclosed embodiments as set forth in the accompanying claims.

DETAILED DESCRIPTION

The technical solution of the present disclosure will be described below in further detail with reference to the accompanying drawings and exemplary embodiments. The exemplary embodiments are not intended to limit the present disclosure.

Figure 1:
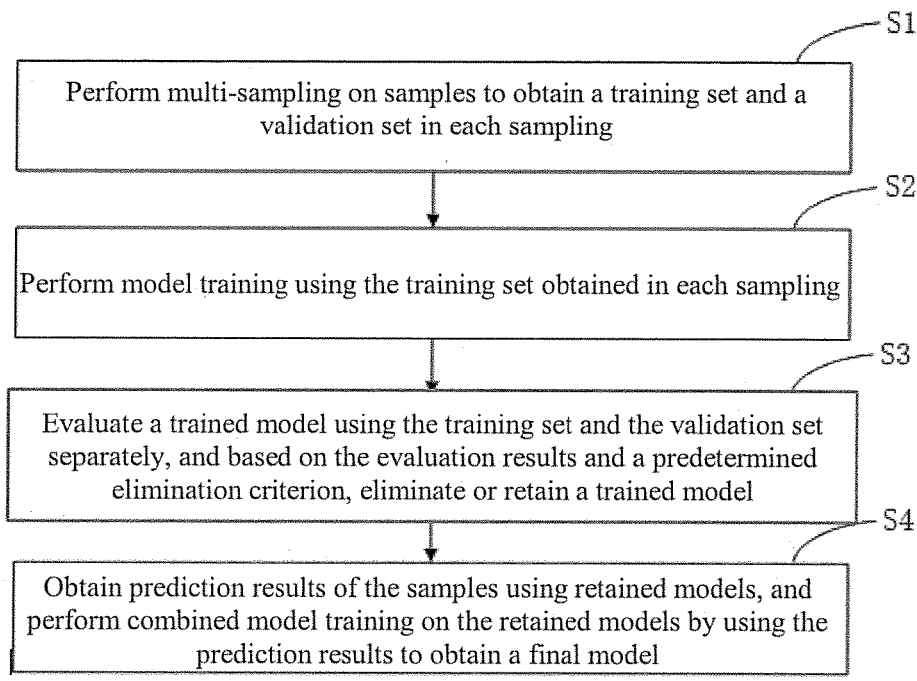
FIG. 1 is a flowchart of an exemplary multi-sampling model training method according to some embodiments of the present disclosure.

FIG. 1 is a flowchart of an exemplary multi-sampling model training method according to some embodiments of the present disclosure. As shown in FIG. 1, a multi-sampling model training method can include the following procedures.

In Step S1, multi-sampling is performed on samples to obtain a training set and a validation set in each sampling. As described herein, "multi-sampling" may refer to repeated random sampling of a data set for a desired number of times.

In one exemplary embodiment, a service scenario of an "Ant Check Later" anti-cash out model is used. Each seller corresponds to a sample and the total quantity of samples is small. The multi-sampling model training method consistent with the present disclosure can directly obtain a predetermined number of training sets and a corresponding number of validation sets from the samples. For example, random sampling is performed on the samples for a predetermined number of times. The samples obtained from each sampling may be used as a training set while the remaining samples may be used as a corresponding validation set. Therefore, n training sets and n validation sets can be obtained by performing sampling n times.

Figure 2:
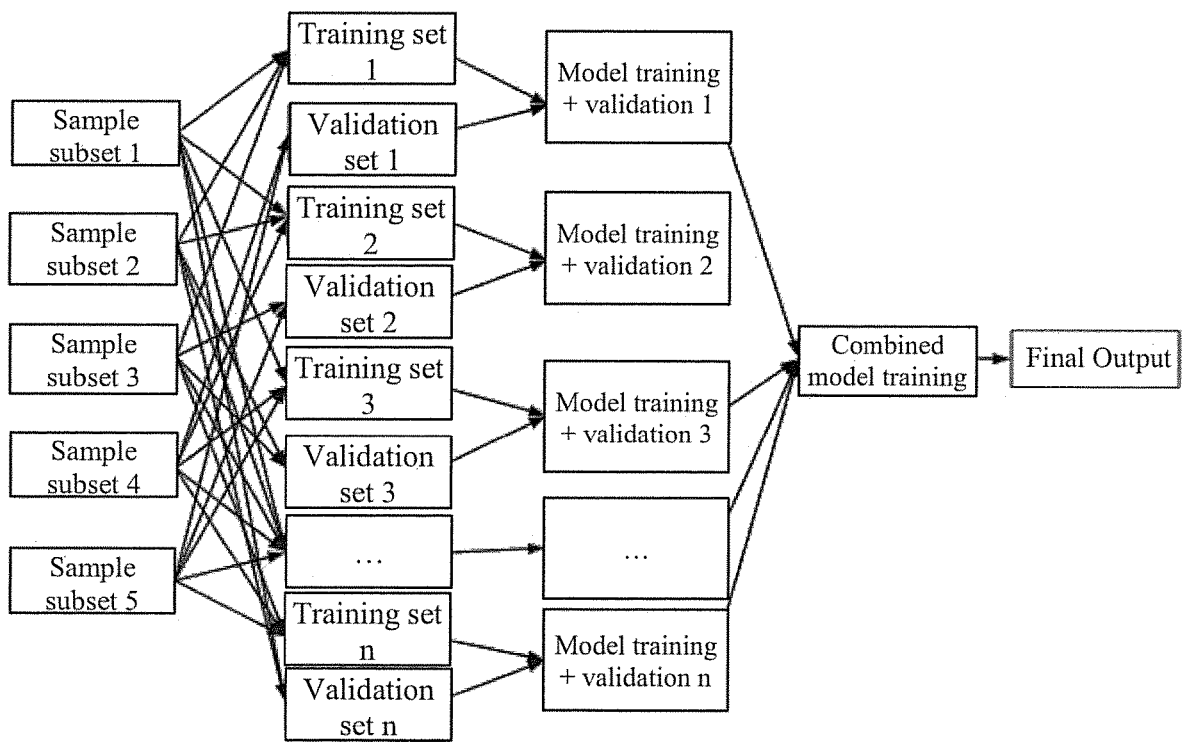
FIG. 2 is a schematic diagram illustrating multi-sampling according to some embodiments of the present disclosure.

In some embodiments, the samples may be first divided into in subsets. Multi-sampling may be performed on the m subsets to obtain n training sets and n validation sets. FIG. 2 is a schematic diagram illustrating multi-sampling on subsets of samples according to some embodiments of the present disclosure As shown in FIG. 2, in one exemplary embodiment, the samples are divided evenly into five subsets, such as data sample subset 1, data sample subset 2, data sample subset 3, data sample subset 4, and data sample subset 5.

In the five data sample subsets, three subsets are randomly selected to obtain a training set, and the remaining two subsets constitute the validation set.

For example, as shown in FIG. 2, a sampling method may be used to repeatedly and randomly sample three subsets among the five subsets for n times to generate n training sets and n validation sets, such as a training set 1, a validation set 1, a training set 2, a validation set 2, . . . , a training set n, a validation set n.

After the multi-sampling as described above in this exemplary embodiment, n training sets and n validation sets are obtained randomly from the original data samples of limited quantity to provide sufficient training samples and validation samples in the subsequent model training procedure.

Referring back to FIG. 1, in Step S2, the training set and the validation set obtained in each sampling are used as a group, and the training set in each group is used for training the model, such as an "Ant Check Later" anti-cash out model.

For example, samples of 100 persons are used. Each sample of the samples has 3 independent variables (X variables), e.g., height 1, weight 2, and age 3; and a dependent variable (Y variable), e.g., a probability that a person is a bad person.

The samples of the 100 persons may be divided into 5 groups to perform multi-sampling as described above. For example, assuming random sampling is repeated for 3 times, generating 3 different training sets for model training. Training the model separately using the three training sets allows for obtaining three sets of first model parameters of three trained models, herein referred to as Group A, $W_{1A}$, $W_{2A}$, $W_{3A}$, Group B, $W_{1B}$, $W_{2B}$, $W_{3B}$, and Group C $W_{1C}$, $W_{2C}$, $W_{3C}$.

As described herein, various training methods may be using for model training, such as logistic regression training or deep neural networks training. The process of performing the model training is a process of obtaining the model parameters by training.

In Step S3, a trained model is evaluated using the training set and the validation set separately, and the trained model is eliminated or retained based on the evaluation results and a predetermined elimination criterion.

Evaluation of the trained models is generally performed according to the receiver operating characteristic curve (ROC curve). For example, a trained model may be evaluated based on the accuracy, sensitivity, or the area under the curve (AUC). The ROC curve of a trained model with better performance is closer to the upper left, and the area under the curve (AUC) is greater. Therefore, the prediction performance of a trained model can be evaluated based on the value of the AUC.

For example, the AUC may be used as an overall performance index for evaluating a trained mode. As used herein, the AUC of a trained model based on the training set and the AUC of the trained model based on the validation set are respectively referred to as AUCtrain and AUCverify.

As described herein, feature value "Criterion" of each trained model is introduced. A model having a Criterion greater than 0 is retained and a model having a Criterion less than 0 is eliminated. For example, a specific formula for calculating Criterion can be the following:

$$Criterion_{model_i} = \frac{|AUC_{train_i} - AUC_{verify_i}|}{AUC_{train_i}} - \frac{1}{n}\sum_{j=1}^{n}\frac{|AUC_{train_j} - AUC_{verify_j}|}{AUC_{train_j}}$$

$$i = 1, 2, \ldots, n$$

As used herein, $AUCtrain_i$ and $AUCverify_i$ respectively refer to the AUCs of the ith trained model based on the training set and AUCs of the ith trained model based on the validation set, and $Criterion_{mode_i}$ refers to a criterion for eliminating the ith trained model.

As described herein, the Kolmogorov-Smirnov test ("KS test") may also be used as the overall performance index for evaluating the trained models. The present disclosure is not limited to a specific performance index or s corresponding elimination criterion.

In Step S4, prediction results of the samples are obtained using the retained models, and the prediction results are used to perform combined model training on the retained models to obtain a final model.

For example, assuming that the three models obtained in Step S3 all meet the elimination criterion and are retained. A score of each of the 100 persons, such as the probability of being a bad person, may be predicted by using the three retained models having three sets of first model parameters respectively. Thus, each person has 3 probability values respectively corresponding to the three retained trained models. For example, a first probability value "probA" based on the first retained trained model may be obtained from probA=pred (height value*$W_{1A}$+weight value*$W_{2A}$+age value*$W_{3A}$). A second probability value "probB" and a third probability value "probC" can be similarly obtained.

Then a combined training is performed using the probability values of the 100 persons obtained in Step S4, such as probA, probB and probC of each person, as inputs while the independent variable remains unchanged to obtain a second set of model parameters WprobA, WprobB and WprobC.

Finally, a final probability of whether a person is a bad person "probFinal" can be obtained according to the following formula:

probFinal=pred(probA*WprobA+probB*WprobB+ probC*WprobC).

The model obtained from the forgoing combined model training is the final model, and can be used for sample identification. The final probability "probFinal" is the final output of the final model having the second set of model parameters. The obtained final model is more robust and stable and provides more accurate prediction results. Moreover, the model can be trained by a program automatically and does not need manual intervention, thereby greatly improving the modeling efficiency.

Figure 3:
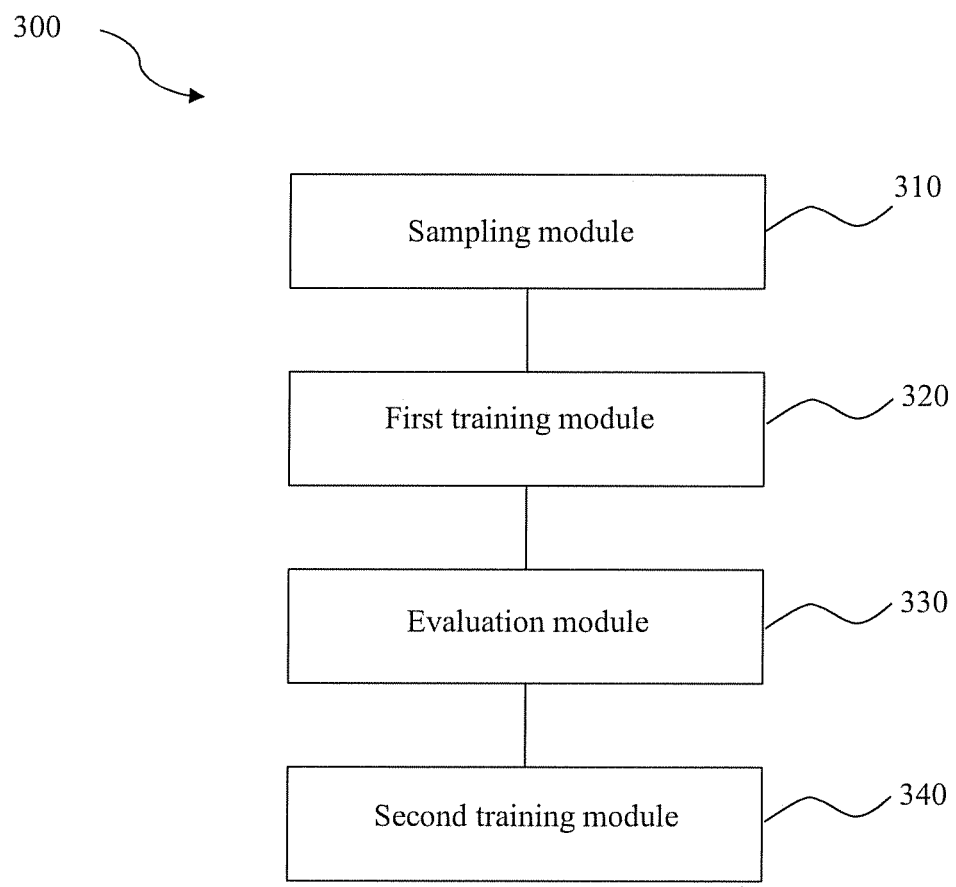
FIG. 3 is a schematic structural diagram of an exemplary multi-sampling model training device according to some embodiments of the present disclosure.

Multi-sampling model training methods as described herein may be utilized by a variety of systems or devices for training predictive models. According to some embodiments of the present disclosure, multi-sampling model training devices are provided. FIG. 3 is a schematic structural diagram of a multi-sampling model training device according to some embodiments of the present disclosure. As shown in FIG. 3, an exemplary multi-sampling model training device 300 may include a sampling module 310, a first training module 320, an evaluation module 330, and a second training module 340.

Sampling module 310 can be configured to perform multi-sampling on samples to obtain a training set and a validation set in each sampling.

First training module 320 can be configured to use the training set and the validation set obtained in each sampling as a group, and to perform model training using the training set in each group.

Evaluation module 330 can be configured to evaluate the training set and the validation set separately by using trained models obtained by the first training module, and to eliminate a trained model according to the evaluation results and a set elimination criterion.

Second training module 340 can be configured to obtain prediction results of the samples using the models retained by the evaluation module, and to perform combined model training on the retained models using the prediction results to obtain a final model.

In some embodiments, when performing multi-sampling on samples to obtain a training set and a validation set in each sampling, sampling module 310 can be further configured to divide the samples into in subsets, and to perform repeated sampling on the m subsets to obtain n training sets and n validation sets. In such instances, the training sets obtained can be more uniform, and allow for a better and more effective model training.

In some embodiments, when evaluating the model trained by the first training model using the training set and the validation set separately, and eliminating a trained model based on the evaluation results and a predetermined elimination criterion, evaluation module 330 can be further configured to perform the following operations.

Evaluation module 330 can be further configured to evaluate each trained model using the training set and the validation set separately to obtain a performance index of each trained model.

Evaluation module 330 can be further configured to obtain a feature value of each trained model based on the performance index of each trained model.

Evaluation module 330 can be further configured to eliminate a trained model in response to determining that the feature value is less than a predetermined threshold.

In some embodiments, the performance index is the AUC of the trained model, and elimination is performed based on a feature value "Criterion" of each trained model as described above.

In some embodiments, when using the training set and the validation set obtained in each sampling as a group, and perform model training using the training set in each group, first training module 320 can be further configured to obtain, by training, a first set of model parameters of each trained model.

In some embodiments, when obtaining prediction results of the samples using the models retained by the evaluation module, and performing combined model training on the retained models using the prediction results, to obtain a final model, second training module 340 can be further configured to perform the following operations.

In some embodiments, the second training module can be configured to obtain prediction results of the samples using the retained models separately, and obtaining first prediction values of each sample of the samples based on the first set of model parameters of each retained trained model.

Second training module 340 can be further configured to use the first prediction values of each sample of the samples to perform another model training to obtain a second set of model parameters.

Second training module 340 can be further configured to obtain a second prediction value of each sample of the samples based on the second set of model parameters and the first prediction values of each sample of the samples, and using the second prediction value as a final output of the model.

Embodiments of the present disclosure allow for obtaining a final model by training, and can be used for sample identification. The obtained final model may be more robust and stable and have more accurate prediction results. Moreover, the modeling process can be executed by a program automatically and does not need manual intervention, thereby greatly improving the modeling efficiency.

It is appreciated that one or more modules in the device embodiments of the present disclosure can be integrated into one unit or can be configured separately. The above-described modules can be combined into one module or can be further divided into multiple sub-modules.

The foregoing embodiments are merely used for illustrating the technical solutions provided by the present disclosure and are not intended to limit the present disclosure. Those skilled in the art can make various changes and modifications consistent with the present disclosure. Such modifications shall fall within the protection scope of the present disclosure.

The present disclosure may be described in a general context of computer-executable commands or operations, such as a program module, stored on a computer-readable medium and executed by a computing device or a computing system, including at least one of a microprocessor, a processor, a central processing unit (CPU), a graphical processing unit (GPU), etc. In general, the program module may include routines, procedures, objects, components, data structures, processors, memories, and the like for performing specific tasks or implementing a sequence of steps or operations.

Embodiments of the present disclosure may be embodied as a method, a device, a system, a computer program product, etc. Accordingly, embodiments of the present disclosure may take the form of an entirely hardware embodiment, an entirely software embodiment, or an embodiment combining software and hardware for allowing a specialized device having the described specialized components to perform the functions described above.

Furthermore, embodiments of the present disclosure may take the form of a computer program product embodied in one or more computer-readable storage media that may be used for storing computer-readable program codes. Based on such an understanding, the technical solutions of the present disclosure can be implemented in a form of a software product. The software product can be stored in a non-volatile storage medium (which can be a CD-ROM, a USB flash memory, a mobile hard disk, and the like). The storage medium can include a set of instructions for instructing a computer device (which may be a personal computer, a server, a network device, a mobile device, or the like) or a processor to perform a part of the steps of the methods provided in the embodiments of the present disclosure. The foregoing storage medium may include, for example, any medium that can store a program code, such as a USB flash disk, a removable hard disk, a Read-Only Memory (ROM), a Random-Access Memory (RAM), a magnetic disk, or an optical disc. The storage medium can be a non-transitory computer-readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It should be noted that, the relational terms such as "first" and "second" are only used to distinguish an entity or operation from another entity or operation, and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items. The term "if" may be construed as "at the time of," "when," "in response to," or "in response to determining."

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

This description and the accompanying drawings that illustrate exemplary embodiments should not be taken as limiting. Various structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A multi-sampling model training method, comprising:
   performing multi-sampling on samples to obtain a plurality of combinations, a respective combination including a training set and a validation set in each sampling, wherein performing the multi-sampling comprises:
      dividing the samples into more than two subsets; and
      randomly dividing, for each sampling, the more than two subsets into the training set and the corresponding validation set, wherein the corresponding validation set includes more than one subset of the more than two subsets;
   using the training set and the validation set obtained in each sampling as a group, and performing model training and obtaining a trained model using the training set in each group;

evaluating the trained model using the training set and the validation set in each group separately;
eliminating or retaining the trained model based on the evaluation results and a predetermined elimination criterion;
obtaining prediction results for the samples from retained models, wherein the prediction results from each of the retained models include prediction results obtained for both the training set and the validation set associated with the respective retained model; and
obtaining an output model by performing combined model training on the retained models using the prediction results for the samples from the retained models as inputs.

2. The multi-sampling model training method of claim 1, wherein evaluating the trained model using the training set and the validation set in each group separately, and eliminating or retaining the trained model based on the evaluation results and a predetermined elimination criterion, comprises:
obtaining a performance index corresponding to the trained model;
obtaining a feature value of the trained model based on the performance index; and
eliminating the trained model in response to determining that the feature value is less than a predetermined threshold.

3. The multi-sampling model training method of claim 1, wherein using the training set and the validation set obtained in each sampling as a group, and performing model training and obtaining a trained model using the training set in each group comprises:
obtaining, by training, a first set of model parameters of the trained model.

4. The multi-sampling model training method of claim 3, wherein obtaining prediction results for the samples from the retained models, and obtaining an output model by performing combined model training on the retained models using the prediction results comprises:
obtaining first prediction values of each sample of the samples based on the first set of model parameters of each retained model;
using the first prediction values of each sample of the samples to perform another model training to obtain a second set of model parameters; and
obtaining a second prediction value of each sample of the samples based on the second set of model parameters and the first prediction values of each sample of the samples, and using the second prediction value as a final output of the output model.

5. A multi-sampling model training device, comprising:
a memory storing a set of instructions; and
a processor configured to execute the set of instructions to cause the multi-sampling model training device to perform:
multi-sampling on samples to obtain a plurality of combinations, a respective combination including a training set and a validation set in each sampling, wherein performing the multi-sampling comprises:
dividing the samples into more than two subsets; and
randomly dividing, for each sampling, the more than two subsets into the training set and the corresponding validation set, wherein the corresponding validation set includes more than one subset of the more than two subsets;
using the training set and the validation set obtained in each sampling as a group, and performing model training and obtaining a trained model using the training set in each group;
evaluating the trained model using the training set and the validation set in each group separately, and eliminating or retaining the trained model based on the evaluation results and a predetermined elimination criterion; and
obtaining prediction results for the samples from retained models, wherein the prediction results from each of the retained models include prediction results obtained for both the training set and the validation set associated with the respective retained model; and
obtaining an output model by performing combined model training on the retained models using the prediction results for the samples from the retained models as inputs.

6. The multi-sampling model training device of claim 5, wherein evaluating the trained model using the training set and the validation set separately, and eliminating or retaining the trained model based on the evaluation results and a predetermined elimination criterion comprises:
obtaining a performance index corresponding to the trained model;
obtaining a feature value of the trained model based on the performance index; and
eliminating the trained model in response to determining that the feature value is less than a predetermined threshold.

7. The multi-sampling model training device of claim 5, wherein using the training set and the validation set obtained in each sampling as a group, and performing model training and obtaining a trained model using the training set in each group comprises
obtaining, by training, a first set of model parameters of the trained model.

8. The multi-sampling model training device of claim 7, wherein obtaining prediction results for the samples from the retained models, and obtaining an output model by performing combined model training on the retained models using the prediction results comprises:
obtaining first prediction values of each sample of the samples based on the first set of model parameters of each retained model;
using the first prediction values of each sample of the samples to perform another model training to obtain a second set of model parameters; and
obtaining a second prediction value of each sample of the samples based on the second set of model parameters and the first prediction values of each sample of the samples, and using the second prediction value as a final output of the output model.

9. A non-transitory computer readable medium that stores a set of instructions that is executable by at least one processor of a computer to cause the computer to perform a multi-sampling model training method, comprising:
performing multi-sampling on samples to obtain a plurality of combinations, a respective combination including a training set and a validation set in each sampling, wherein performing the multi-sampling comprises:
dividing the samples into more than two subsets; and
randomly dividing, for each sampling, the more than two subsets into the training set and the corresponding validation set, wherein the corresponding validation set includes more than one subset of the more than two subsets;

using the training set and the validation set obtained in each sampling as a group, and performing model training and obtaining a trained model using the training set in each group;

evaluating the trained model using the training set and the validation set in each group separately;

eliminating or retaining the trained model based on the evaluation results and a predetermined elimination criterion;

obtaining prediction results for the samples from retained models, wherein the prediction results from each of the retained models include prediction results obtained for both the training set and the validation set associated with the respective retained model; and obtaining an output model by performing combined model training on the retained models using the prediction results for the samples from the retained models as inputs.

10. The non-transitory computer readable medium of claim 9, wherein evaluating the trained model using the training set and the validation set in each group separately, and eliminating or retaining the trained model based on the evaluation results and a predetermined elimination criterion, comprises:

obtaining a performance index corresponding to the trained model;

obtaining a feature value of the trained model based on the performance index; and eliminating the trained model in response to determining that the feature value is less than a predetermined threshold.

11. The non-transitory computer readable medium of claim 9, wherein using the training set and the validation set obtained in each sampling as a group, and performing model training and obtaining a trained model using the training set in each group comprises:

obtaining, by training, a first set of model parameters of the trained model.

12. The non-transitory computer readable medium of claim 11, wherein obtaining prediction results for the samples from the retained models, and obtaining an output model by performing combined model training on the retained models using the prediction results comprises:

obtaining first prediction values of each sample of the samples based on the first set of model parameters of each retained model;

using the first prediction values of each sample of the samples perform another model training to obtain a second set of model parameters; and obtaining a second prediction value of each sample of the samples based on the second set of model parameters and the first prediction values of each sample of the samples, and using the second prediction value as a final output of the output model.

* * * * *